March 31, 1925.  
W. H. BALL ET AL  
ATTACHMENT FOR TRACTORS  
Filed June 25, 1923

1,531,829

INVENTOR
William H. Ball and
William A. Nottingham,
BY

Arthur M. Hood
ATTORNEY

Patented Mar. 31, 1925.

1,531,829

UNITED STATES PATENT OFFICE.

WILLIAM H. BALL, OF MUNCIE, AND WILLIAM A. NOTTINGHAM, OF EATON, INDIANA.

ATTACHMENT FOR TRACTORS.

Application filed June 25, 1923. Serial No. 647,607.

*To all whom it may concern:*

Be it known that we, WILLIAM H. BALL and WILLIAM A. NOTTINGHAM, citizens of the United States, residing at Muncie and Eaton, respectively, in the county of Delaware and State of Indiana, have invented a new and useful Attachment for Tractors, of which the following is a specification.

Our invention relates to attachments for tractors and the like and is particularly applicable to the so-called Fordson tractor.

One of the objects of our invention is to provide an attachment for increasing the diameter of the rear wheels and for raising the front end of the tractor whereby the frame will have a greater clearance. The Fordson tractor, as it is at present constructed, has a clearance of about eleven and five eighth inches between the frame and ground and in certain uses of the tractor, particularly for drawing corn cultivators and the like for high growing crops, after the crops have reached a certain height the small clearance makes unadvisable the continued use of the tractor. By our attachment we are enabled to elevate the frame and increase the clearance of the tractor to twenty six inches and thus provide for the continued use of the tractor after the crops have reached a greater height.

Figure 1:
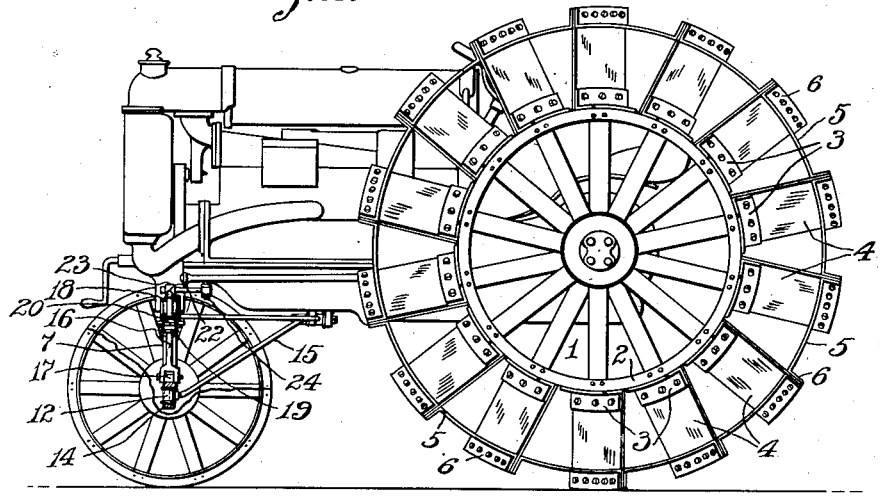
Figure 2:
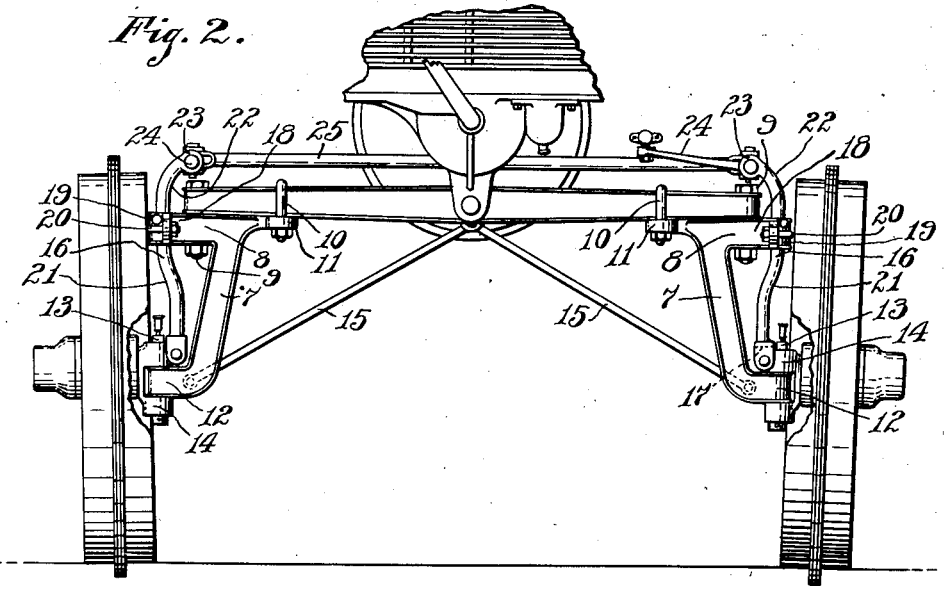
Figure 3:
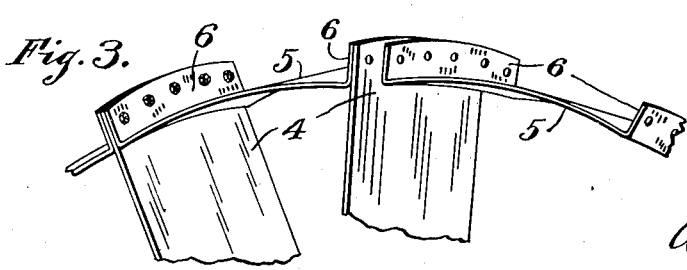

For the purpose of disclosing our invention we have illustrated one embodiment thereof in the accompanying drawings, in which, Fig. 1 is a side elevation of a Fordson tractor provided with our attachment;

Fig. 2 is a front elevation of the front axle of the tractor showing the raising attachment therefor, and Fig. 3 is an enlarged detail of a tractor wheel showing our means for increasing the diameter of the wheel.

In the embodiment of our invention illustrated, each of the rear tractor wheels comprises the usual Fordson tractor wheel 1 which, as is usual in this construction, is provided with a rim 2 provided around its periphery with a series of cleats or lugs 3. These cleats are preferably formed of angles or the like, the horizontal angle being bolted or otherwise secured to the rim of the wheel and the vertical portion forming the cleat or lug to increase the traction of the tractor. For increasing the diameter of each of the rear wheels of the tractor without disassembling the wheel or modifying the wheel, we provide a series of supplemental spokes 4. These spokes preferably take the form of a plate, the bottom end of which is slightly curved to fit the crown or curvature of the wheel rim 2 and the plates are securely bolted or otherwise secured to the vertical portion of the cleats or lugs 3.

For forming the supplemental rim of the wheel we provide a series of rim plates or sections 5, which, as shown, are interposed between the outer ends of the spoke plates 4 and then provided at each end with upturned flanges 6. These plates have their front and rear ends diagonally disposed with respect to the sides so that the flanges 6 will lie parallel with the spoke plates 4. The rim plates are suitably secured to the spoke plates by bolts which pass through the flanges 6 and through the upper ends of the spoke plates. By this arrangement we are enabled to provide a supplemental rim having a series of traction cleats or lugs similar in effect to the traction cleats or lugs of the primary rim, which supplementary rim however, is of greater diameter than the primary rim, thereby elevating the rear end of the tractor frame. In practice we have found that fourteen sets of supplemental rim plates and spoke plates are sufficient to give sufficient rigidity to the supplemental rim and that we are enabled to increase the diameter of the wheel thirty inches although this number of plates and diameter is not compulsory and various modifications may be made therein without departing from the spirit of the invention.

For raising the front end of the tractor frame so that it will correspond with the elevation of the rear end, we provide at each end of the front axle an extension leg 7. This leg is provided with a base 8, the upper surface of which lies parallel with, and supports the front axle and is provided with an opening arranged to coincide with the spindle pin opening of the axle so that a bolt 9 may be substituted for the spindle pin of the front wheel spindle and secure one end of the base in position. The opposite end of the base is secured to the axle by a U bolt 10 which fits over the axle and passes through openings in ears 11 on the base 8. The leg at its lower end is provided with an outturned horizontal portion 12 having formed therein a spindle opening corresponding in construction and size to the spindle opening of the front axle and adapted to receive the spindle pin 13 of the front wheel spindle 14. This construction permits of the securing of the front wheel to the extension leg without changing the construction of the wheel or its spindle or any of the parts thereof.

In securing the attachment in place it is merely necessary to remove the wheel from the spindle pin opening of the front axle, attach the extension leg and then replace the spindle on the extension leg.

In order to brace the extension legs 7 we provide a pair of braces 15, the front ends of which are secured to the lower ends of the extension legs and the rear ends of which are connected together and to the frame at the point the radius rods of the tractor are connected.

Each of the steering arms is provided with an extension rod 16 which is vertically arranged and has its lower end bifurcated as at 17 to connect with the front axle by means of a suitable bolt. The upper end of this rod is journaled in an extension 18 of the base 8 and having a removable cap 19 secured by a U bolt 20. This arm, toward its upper and lower ends, is offset as at 21 and 22, the offset 22 being provided with an eye 23 to receive the arm 24 which in turn is connected to the steering arm 25.

We claim as our invention:

1. An attachment for tractors, comprising in combination, means for increasing the diameter of the traction wheels of the tractor including a series of supplemental spokes arranged to be secured to the rim of the tractor wheel and a supplemental rim secured to the outer ends of said spokes said spokes thereby spacing the supplemental rim from the tractor wheel rim, and extension legs arranged to be secured to the front axle of the tractor and adapted to receive the front wheels of the tractor.

2. An attachment for tractors, comprising in combination, means for increasing the diameter of the traction wheels of the tractor including a plurality of supplemental spokes comprising plates adapted to be secured to the tractor lugs or cleats on the traction wheels and a plurality of rim sections arranged to be secured to said spoke plates, and extension legs secured to the front axle and arranged to receive the front wheels of the tractor.

3. In an attachment for tractors, in combination, means for increasing the diameter of the traction wheels of the tractor including a series of supplemental spoke plates arranged to be secured to the traction cleats of the traction wheels and a plurality of rim plates provided with up-turned flanges and arranged to be interposed between said spoke plates and be secured to said spoke plates by means passing through the up-turned flanges and plates, and extension legs for the front axle of the tractor arranged to receive the front wheels of the tractor.

4. In an attachment for tractors, in combination, means for increasing the diameter of the traction wheels of the tractor including a plurality of spoke plates adapted to be secured at their lower ends to the diagonally disposed traction cleats of each of the traction wheels and a plurality of rim plates having their front and rear edges diagonally disposed with respect to the side edges thereof and provided with up-turned flanges, said rim plates being interposed between the spoke plates at their outer ends and secured thereto by means passing through the flanges and plates and means for raising the front end of the tractor a distance corresponding to the increased diameter of the traction wheels.

5. In an attachment for tractors, the combination with supplemental rims and spokes for the traction wheels for increasing the diameter of said wheels, of an extension leg for each end of the front axle including a base, supporting and secured to the end of the axle and having an opening coinciding with the axle spindle pin opening, a bolt passing through said openings for securing the base in position.

6. In an attachment for tractors, the combination with a supplemental rim and spokes for each of the traction wheels of the tractor for increasing the diameter thereof, of means for raising the front end of the tractor correspondingly, comprising a pair of extension legs each leg having a base arranged to fit the under side of the front axle and having an opening coinciding with the spindle pin opening in the axle to receive a securing bolt arranged to pass through said openings and adapted to be additionally secured to the axle by a U bolt, said leg at its lower end having a horizontal arm provided with a spindle pin opening and means for extending the steering mechanism to coincide with each extended leg.

7. In an attachment for tractors, the combination with means for increasing the diameter of the traction wheels of the tractor, of means for correspondingly elevating the front end of the tractor comprising a pair of extension legs, each of said legs having means for securing the same to the front axle of the tractor and provided at its lower end with a spindle pin receiving opening to receive the spindle of the steering wheel, a vertically extending steering rod at each end of the axle, a mounting therefor secured in position by the same means which secures the extension leg in position, said rod at its lower end being adapted to be secured to one of the steering wheels and at its upper end having a crank arm arranged to be secured to the steering arm of the steering mechanism.

8. In an attachment for tractors, in combination, means arranged to be attached to the front axle for increasing the clearance between said axle and the ground, including a pair of extension legs, each leg having a base arranged to fit the under side of the front axle and having an opening coinciding with the spindle pin opening in the axle, said leg at its lower end having a horizontal arm provided with a spindle pin opening, means for extending the steering mechanism to coincide with each extended leg, and rear wheels for the tractor sufficiently large in diameter to raise the rear end of the tractor to correspond with the increased clearance of the front end thereof.

9. In an attachment for tractors, in combination, an extension leg for each end of the front axle, including a base supporting and secured to the end of the axle and having an opening coinciding with the axle spindle pin opening and means for receiving the spindle pin of the front wheels, and rear wheels for the tractor sufficiently large in diameter to raise the rear end of the tractor to correspond with the increased clearance of the front end of the tractor.

In witness whereof, we have hereunto set our hands at Indianapolis, Indiana, this 19th day of June, A. D. one thousand nine hundred and twenty-three.

WILLIAM H. BALL.
WILLIAM A. NOTTINGHAM.